(12) United States Patent
Voicu

(10) Patent No.: US 11,688,192 B2
(45) Date of Patent: Jun. 27, 2023

(54) RETRAINING A COMPUTER VISION MODEL FOR ROBOTIC PROCESS AUTOMATION

(71) Applicant: UiPath, Inc., New York, NY (US)

(72) Inventor: Cosmin Voicu, Bucharest (RO)

(73) Assignee: UiPath, Inc., New York, NY (US)

(*) Notice: Subject to any disclaimer, the term of this patent is extended or adjusted under 35 U.S.C. 154(b) by 0 days.

(21) Appl. No.: 18/048,754

(22) Filed: Oct. 21, 2022

(65) Prior Publication Data
US 2023/0059729 A1 Feb. 23, 2023

Related U.S. Application Data

(63) Continuation of application No. 16/517,225, filed on Jul. 19, 2019, now Pat. No. 11,487,973.

(51) Int. Cl.
*G06V 30/40* (2022.01)
*G06N 20/00* (2019.01)
(Continued)

(52) U.S. Cl.
CPC ............. *G06V 30/40* (2022.01); *B25J 9/163* (2013.01); *B25J 9/1697* (2013.01);
(Continued)

(58) Field of Classification Search
CPC .. G06K 9/6263; G06K 9/6253; G06K 9/6256; B25J 9/163; B25J 9/1697;
(Continued)

(56) References Cited

U.S. PATENT DOCUMENTS 10,365,799 B2 * 7/2019 Hosbettu ............... G06F 3/0481
10,776,926 B2 * 9/2020 Shrivastava .......... G06F 18/214
(Continued)

FOREIGN PATENT DOCUMENTS

AU 2014277851 A1 7/2016
EP 3161733 A1 5/2017
(Continued)

OTHER PUBLICATIONS

Boubacar Abdou Tchoussou, "Non-Final Office Action", dated Jun. 6, 2022, U.S. Appl. No. 16/517,225.
(Continued)

*Primary Examiner* — Boubacar Abdou Tchoussou
(74) *Attorney, Agent, or Firm* — LeonardPatel PC; Michael A. Leonard, II; Sheetal S. Patel

(57) ABSTRACT

A Computer Vision (CV) model generated by a Machine Learning (ML) system may be retrained for more accurate computer image analysis in Robotic Process Automation (RPA). A designer application may receive a selection of a misidentified or non-identified graphical component in an image form a user, determine representative data of an area of the image that includes the selection, and transmit the representative data and the image to an image database. A reviewer may execute the CV model, or cause the CV model to be executed, to confirm that the error exists, and if so, send the image and a correct label to an ML system for retraining. While the CV model is being retrained, an alternative image recognition model may be used to identify the misidentified or non-identified graphical component.

22 Claims, 18 Drawing Sheets

(51) Int. Cl.
  *B25J 9/16*    (2006.01)
  *G06F 18/21*   (2023.01)
  *G06F 18/40*   (2023.01)
  *G06V 30/10*   (2022.01)

(52) U.S. Cl.
  CPC .......... *G06F 18/2178* (2023.01); *G06F 18/40* (2023.01); *G06N 20/00* (2019.01); *G06V 30/10* (2022.01)

(58) Field of Classification Search
  CPC .......... G06N 20/00; G06N 3/08; G06V 30/10; G06V 30/40; G06V 10/22; G06F 30/20; G06F 9/452; G06F 30/27; G06F 3/14; G06T 7/11; G06T 1/60; G06T 2207/20081
  See application file for complete search history.

(56) References Cited

U.S. PATENT DOCUMENTS

| | | | |
|---|---|---|---|
| 10,878,270 B1* | 12/2020 | Cao | ........................ G06V 10/82 |
| 11,227,176 B2 | 1/2022 | Wu et al. | |
| 2009/0063946 A1 | 3/2009 | Balasubramanian | |
| 2010/0138775 A1 | 6/2010 | Kohen et al. | |
| 2011/0047488 A1 | 2/2011 | Butin et al. | |
| 2014/0068553 A1 | 3/2014 | Balasubramanian | |
| 2015/0269431 A1* | 9/2015 | Haji | ........................ G06V 40/30 382/186 |
| 2017/0228119 A1 | 8/2017 | Hosbettu et al. | |
| 2018/0157386 A1 | 6/2018 | Su | |
| 2018/0370029 A1 | 12/2018 | Hall et al. | |
| 2019/0126463 A1 | 5/2019 | Purushothaman | |
| 2019/0163499 A1 | 5/2019 | Kebets et al. | |
| 2019/0205363 A1 | 7/2019 | Zukerman et al. | |
| 2020/0364485 A1 | 11/2020 | Wu et al. | |

FOREIGN PATENT DOCUMENTS

| | | |
|---|---|---|
| EP | 3206170 | 8/2017 |
| JP | H0561845 U | 8/1993 |
| JP | H11252450 A | 9/1999 |
| JP | 2011059810 A | 3/2011 |
| JP | 2019008796 A | 1/2019 |
| JP | 2019512827 A | 5/2019 |
| WO | 2017156628 A1 | 9/2017 |

OTHER PUBLICATIONS

Boubacar Abdou Tchoussou, "Notice of Allowance", dated Sep. 21, 2022, U.S. Appl. No. 16/517,225.

Daniel Kraus, "Machine Learning and Evolutionary Computing for GUI-based Regression Testing," Masters Thesis for Hochschule Karlsruhe Technik und Wirtschaft available at https://arxiv.org/pdf/1802.03768.pdf (Aug. 31, 2017).

Notice of Allowance issued in Japanese Application No. 2020-121359 dated Feb. 1, 2022.

Notification of Reasons for Refusal issued in JP Application No. 2020-121359 dated Oct. 29, 2021.

Office Action issued in Korean Application No. 10-2020-0088333 dated Aug. 12, 2022.

Supplementary European Search Report issued in European Application No. EP 20186417.0 dated Dec. 7, 2020.

Office Action issued in Korean Application No. 10-2020-0088333 dated Feb. 23, 2023.

* cited by examiner

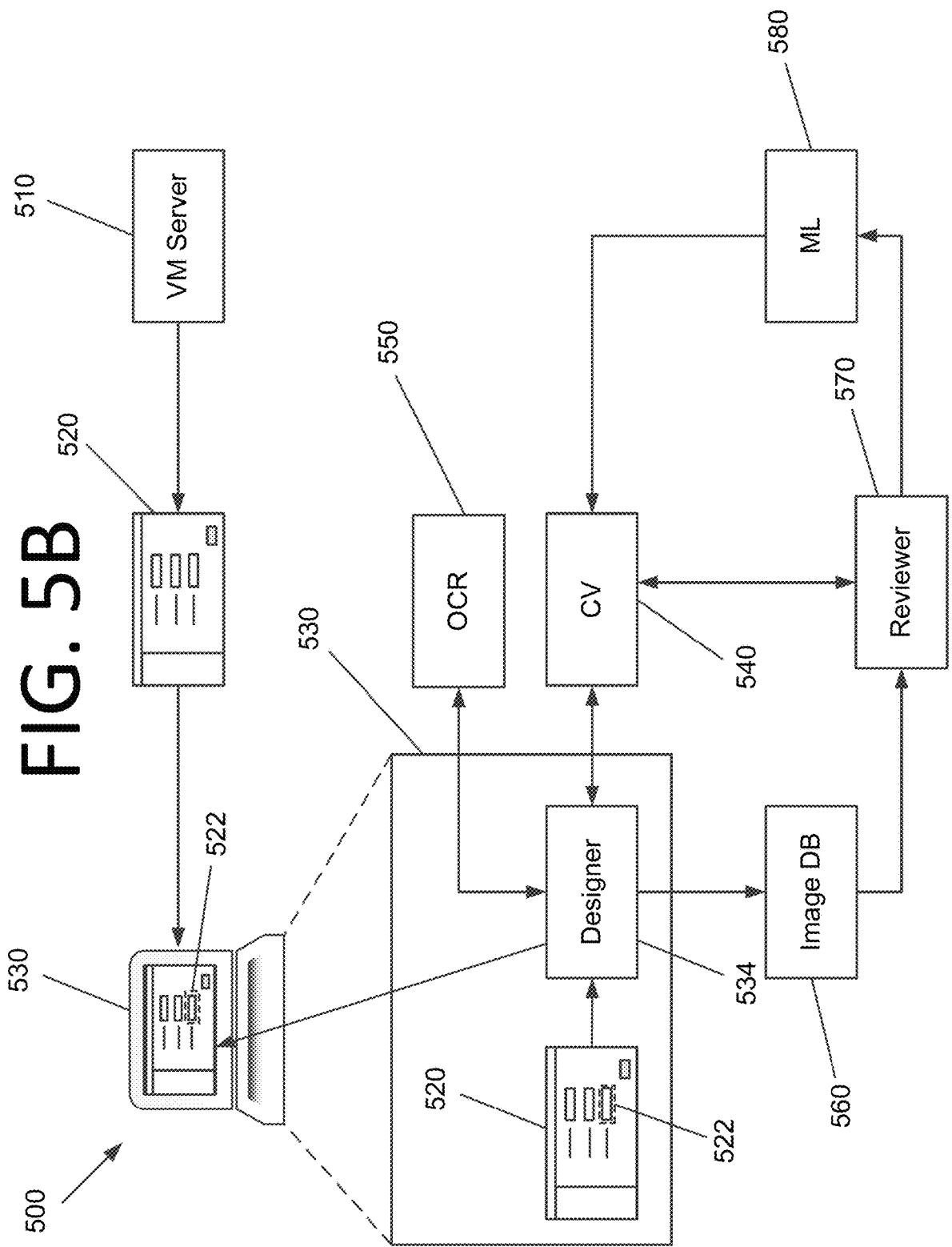

RETRAINING A COMPUTER VISION MODEL FOR ROBOTIC PROCESS AUTOMATION

CROSS-REFERENCE TO RELATED APPLICATION

This application is a continuation of, and claims priority to, U.S. patent application Ser. No. 16/517,225 filed on Jul. 19, 2019. The subject matter thereof is hereby incorporated herein by reference in its entirety.

FIELD

The present invention generally relates to Robotic Process Automation (RPA), and more specifically, to identifying misidentified or non-identified graphical components and retraining a Computer Vision (CV) model for RPA generated by a Machine Learning (ML) system for more accurate computer image analysis.

BACKGROUND

Currently, training data to automate ML-generated CV model algorithms for recognizing image features for RPA are obtained by generating synthetic data and collecting screenshots (i.e., digital images) of actual user interfaces of various software applications, whether from live applications or the Internet. Synthetic data is data that is produced with the specific purpose of training ML models. This differs from "real" or "organic" data, which is data that already exists and just needs to be collected and labeled. In this case, organic data includes screenshots that are collected through various mechanisms and labeled.

Another source of training data is the screenshots of the application that the user wants to automate. In this approach, if a graphical element of the interface (e.g., a checkbox, a radio button, a text box, etc.) is not being detected by the CV model, the user (e.g., a customer) may select the element that was not identified, create screenshots of the selection, and send the images with the coordinates of the selection to the service provider. However, this approach requires the user to expend the effort to send the images as feedback and report the error. In practice, most users do not do this.

Also, data captured through current techniques can become suboptimal or irrelevant after implementation. For example, the actual user interface of the application used by a customer at runtime may be different from user interfaces that are used for training data during design time. This renders the CV model unaware of, and potentially unsuited for, the actual user interface, and the CV model may require retraining in order to operate effectively as a result. Accordingly, an improved approach to retraining CV models may be beneficial.

SUMMARY

Certain embodiments of the present invention may provide solutions to the problems and needs in the art that have not yet been fully identified, appreciated, or solved by current CV model techniques. For example, some embodiments of the present invention pertain to identifying misidentified or non-identified graphical components and retraining a CV model for RPA generated by an ML system for more accurate computer image analysis.

In an embodiment, a computer program is embodied on a non-transitory computer-readable medium. The program is configured to cause at least one processor to receive identifications of graphical components within an image from execution of a CV model and display the image with the identified graphical components that were identified by the CV model on a visual display. The computer program is also configured to cause the at least one processor to receive a selection of a misidentified or non-identified graphical component in the image, determine representative data of an area of the image that includes the selection, and transmit the representative data and the image to an image database.

In another embodiment, a computing system includes memory storing machine-readable computer program instructions and at least one processor configured to execute the computer program instructions. The instructions are configured to cause the at least one processor to receive a selection of a misidentified or non-identified graphical component in an image, determine representative data of an area of the image that includes the selection, and transmit the representative data and the image to an image database for retraining of a CV model. The instructions are also configured to cause the at least one processor to receive identifications of graphical components within the image from execution of a retrained CV model and display the image with the identified graphical components that were identified by the retrained CV model on a visual display.

In yet another embodiment, a computer-implemented method includes receiving a selection, by a computing system, of a misidentified or non-identified graphical component in an image and determining, by the computing system, representative data of an area of the image that includes the selection. The computer-implemented method also includes transmitting, by the computing system, the representative data and the image to an image database and embedding the image and alternative image processing logic in a workflow, by the computing system, to identify the misidentified or non-identified graphical component while the CV model is being retrained.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 5B illustrates the RPA implementation of FIG. 5A where a graphical component was not identified or misidentified at design time, according to an embodiment of the present invention.

DETAILED DESCRIPTION OF THE EMBODIMENTS

Figure 1:
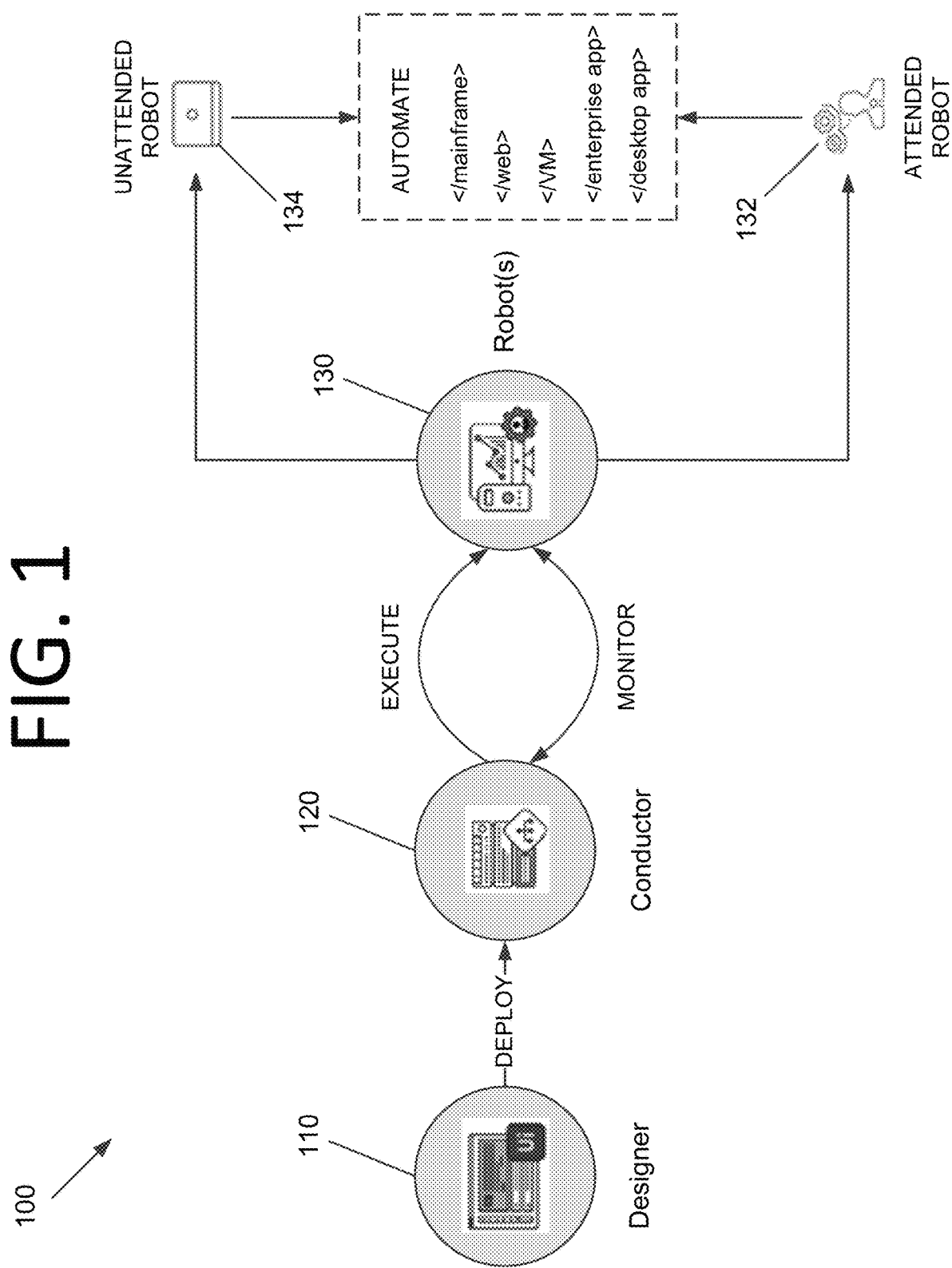
FIG. 1 is an architectural diagram illustrating an RPA system, according to an embodiment of the present invention.

Some embodiments pertain to identifying misidentified or non-identified graphical components and retraining a CV model for RPA generated by an ML system for more accurate computer image analysis. A screenshot image of a visual display may be captured that includes a Graphical User Interface (GUI) of an application to be automated. In Virtual Machine (VM) embodiments, such as Citrix®, VMWare®, VNC®, Windows® Remote Desktop, etc., or in certain Flash, Silverlight, or PDF documents, only an image may be presented for a given application. Images may include a window, a document, a financial receipt, an invoice, and/or any other graphical element without deviating from the scope of the invention. While in some embodiments, an image may include unstructured data, in certain embodiments, the data is structured.

A CV model, potentially in conjunction with a text recognition model from OCR, may then be executed on the screenshot image, and specific graphical components identified in the image may be provided to a designer that accepts the screenshot image and data identifying the components from CV/OCR as an input, and then displays indications of identified graphical components for a user on a visual display (e.g., a computer monitor, a laptop screen, a smart phone, a virtual reality or augmented reality display device, etc.). In the case that there are one or more misidentified or non-identified graphical components on the visual display (e.g., checkboxes, text boxes, radio buttons, regular buttons, etc.), the user may make selections encompassing these graphical components on his or her screen. In some embodiments, providing the user with a working alternative (e.g., providing the user with the ability to use an image-matching algorithm for a misidentified or non-identified graphical component) may incentivize the user to make the selection. It should be noted that in some embodiments, graphical components may include visual display elements identifiable by a CV model, as well as visual display elements identifiable by OCR, and/or visual display elements that require identification by both (e.g., a text field that includes at least some text). From the selection(s), the designer may determine representative data of the area(s) of the visual display that were selected by the user.

In some embodiments, this representative information includes coordinates, line segments, or both, that define a shape having an area. In certain embodiments, the selection may be rectangular, circular, elliptical, square, hexagonal, freeform, and/or any other suitable shape without deviating from the scope of the invention. In some embodiments, the user may be able to select between multiple types of shapes that may best fit each graphical component of interest. For instance, a rectangular shape may best fit a text box, whereas a circular shape may best fit a radio button. In certain embodiments, the computing system may attempt to infer and complete a free form shape that is not fully enclosed.

It should be noted that in some embodiments, the shape may be a three-dimensional shape having a volume (i.e., voxels instead of pixels) if suitable hardware is used, with associated adjustments to the representative information. For instance, an augmented reality headset may be used that detects the location of the user's finger, a pointer device with an embedded sensor may provide three-dimensional position, etc. Such a system may define a box or sphere instead of a rectangle or circle, for instance.

The designer then transmits the screenshot image and representative data to an image database, and a reviewer then receives this information from the image database. This transmission may occur automatically or at the user's command. That the transmission happens automatically in some embodiments without additional actions from the user is novel. Indeed, in some embodiments, the user may be identifying misidentified and/or non-identified graphical components without any knowledge that the retraining process has been initiated, or that he or she has played a role therein. The reviewer, via his or her computing system, reviews the screenshot image and the area selected by the user using his or her designer application, and confirms that the error exists. For instance, the human reviewer may then review the selection made by the user for false positives to ensure that the non-identification(s) and/or misidentification(s) actually occurred. For instance, the human reviewer may verify that the user has not selected the maximize/minimize icon for a window as not being identified. If so, the reviewer submits the screenshot image and representative data to an ML system for retraining. In some embodiments, retraining is done in a batch with other issues that have been identified. In some embodiments, other images from design time in the image database are used to augment the retraining. In certain embodiments, the ML system is the same ML system that was used to train the CV model, but updated based on the screenshot image and the representative data (and possibly to address other errors in some embodiments per the above). The ML system then retrains the CV model, producing a retrained CV model that more accurately identifies the misidentified and/or non-identified graphical component(s). The retrained CV model is then sent to a computing system running the CV model (e.g., a separate server, the user's computing system, etc.), and the retrained CV model is used to properly identify all non-textual graphical components, including the misidentified and/or non-identified graphical component(s).

Retraining of the CV model may employ one or more Deep Learning Neural Networks (DLNNs). For instance, TensorFlow®, PyTorch®, etc. may be used. However, this DLNN-based retraining may take days or weeks to complete. Accordingly, in some embodiments, an alternative image recognition technology may be employed by the user to recognize the misidentified or non-identified component. For instance, an image matching algorithm may be used on the area(s) of the screen selected by the user to attempt to identify the graphical component(s) therein. The designer may embed this logic in the workflow to be used for future processing until the retrained CV model is ready and deployed. While image matching is typically less accurate than the multi-anchor techniques discussed herein, it may provide a stopgap that allows the misidentified or non-identified graphical component to be identified with at least some level of accuracy while the CV model is retrained. This further incentivizes the user to make selections of misidentified and/or nonidentified graphical components since it provides an immediate temporary solution.

In some embodiments, the user selects an option to use the less accurate algorithm when the graphical component is not identified or misidentified. However, in certain embodiments, the user may not be aware that anything is occurring behind the scenes when they make a selection, and the designer may automatically embed the alternative image recognition model in the workflow for the missed or misidentified component. Thus, making the selection and clicking an "OK" button, for example, may be the only interaction that the user knows they are having with the system.

Reliably automating Virtual Desktop Infrastructure (VDI) environments, such as Citrix®, VMWare®, VNC®, and Windows® Remote Desktop, has been difficult to accomplish using RPA. In a typical RPA implementation for native computing systems, selectors are used, which work using the underlying properties of the elements of the User Interface (UI) to identify application elements (e.g., buttons, text fields, etc.). However, this technique breaks down when trying to automate the same software in a VDI environment. The reason for the breakdown is that VDI environments stream an image of the remote desktop in a similar manner to how video streaming services do. There are simply no selectors to be identified in the images (i.e. "frames") of the "video." Attempts have been made to solve this challenge using Optical Character Recognition (OCR) and image matching. However, these techniques have proven to be insufficiently reliable and have caused maintenance issues since even minor changes in the UI tend to break the automations.

However, use of CV models, such as those employed by UiPath®, provides the ability to automate such image-based environments using deep learning. Designers (and later, robots) in some embodiments may enable human-like recognition of user interfaces using a mix of Artificial Intelligence (AI), CV, OCR, text fuzzy-matching, and a novel anchoring system, which may be single anchor or multi-anchor. This allows such designers/robots to "see" the screen and visually identify its graphical components instead of relying on their hidden properties, identifiers, and other metadata. It should be noted that this CV-based approach is not limited to VDI environments in some embodiments. Certain embodiments can also recognize visual graphical components across a wide range of cases where traditional UI automation techniques struggle, including, but not limited to, SAP, Flash, Silverlight, PDFs, images of various formats (e.g., JPG, PNG, BMP, etc.), etc.

Unlike traditional image automation, some embodiments do not rely on image matching for the primary CV model. As a result, such embodiments may be highly resilient to interface changes including, but not limited to, color, font, size, resolution changes, etc. that would break an image matching model for that interface. The CV model of some embodiments may be able to handle these changes all at once and still find the intended graphical components.

Some embodiments may be particularly beneficial for VM architectures, such as a thin client architecture. However, virtualization could be performed with client computing systems of any suitable power and functionality (e.g., stand-alone desktop and laptop computing systems, smart phones, etc.). In a thin client architecture, for instance, the client computing system is a lightweight computer that establishes a remote connection with a server or network of servers, whether locally located or distributed (e.g., a cloud computing architecture). Typically, a client VM session is executed on one server.

The server performs most of the tasks of a conventional personal computer (i.e., launching software applications and storing data) and sends screen images to the client computing system. The client computing system tracks keystrokes and mouse clicks (or touches on a haptic interface) of where the user is interacting with the image and sends this information to the server. The server then provides this information to a corresponding application executing on the server that the user is seeking to interact with. The screen image is then updated accordingly and sent to the user, which typically mimics the application as if it were executing on the user's computing system. Typically, screen updates are sent to the thin client in real time or near-real time.

Since images are used, some embodiments may be well suited to use in VM systems, per the above. The CV model seeks to identify graphical components contained within the image. This may be augmented with a text recognition module that seeks to identify text in the image, which may be included within graphical components (e.g., a text box, a text field, etc.).

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™ In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
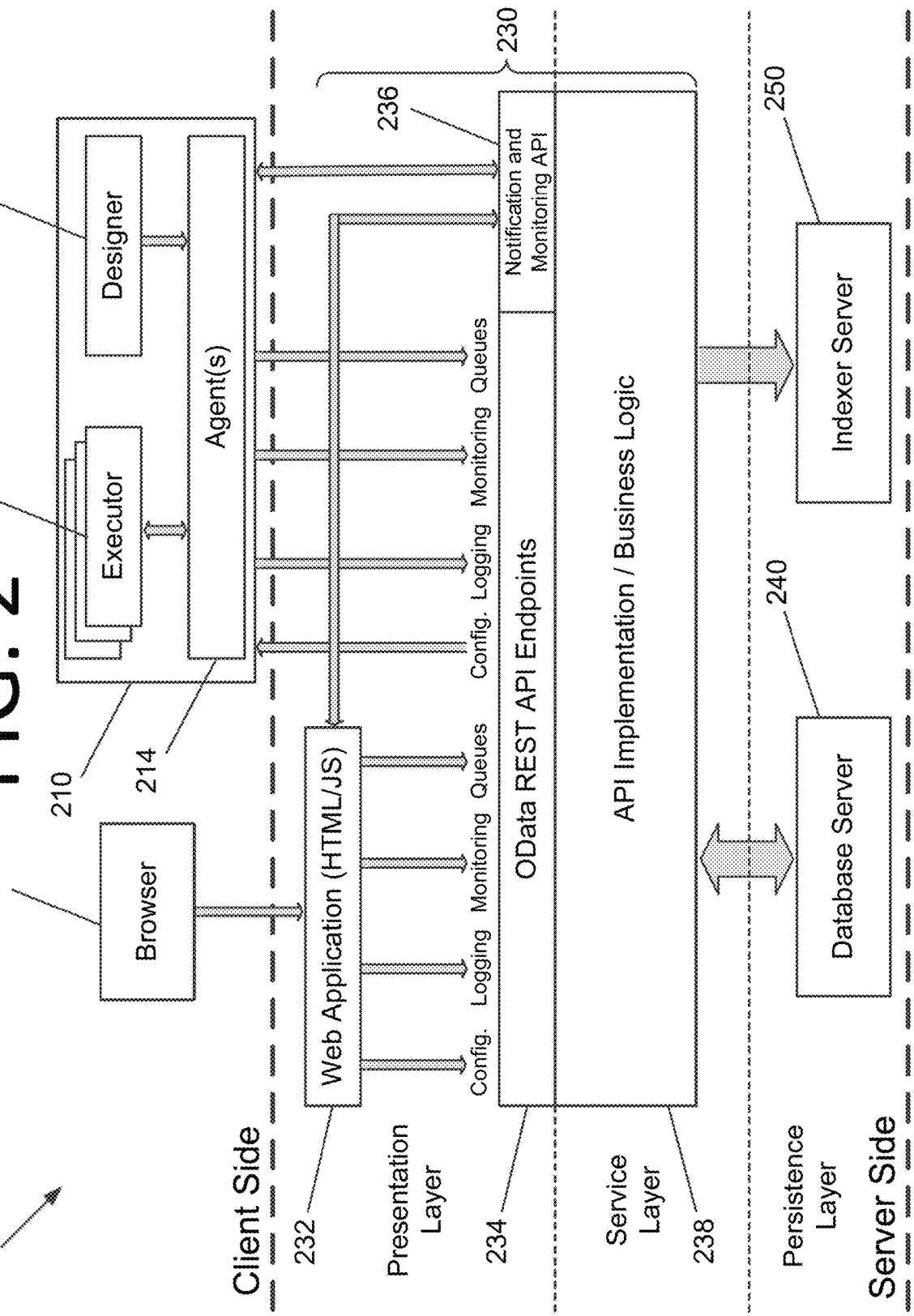
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 220 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
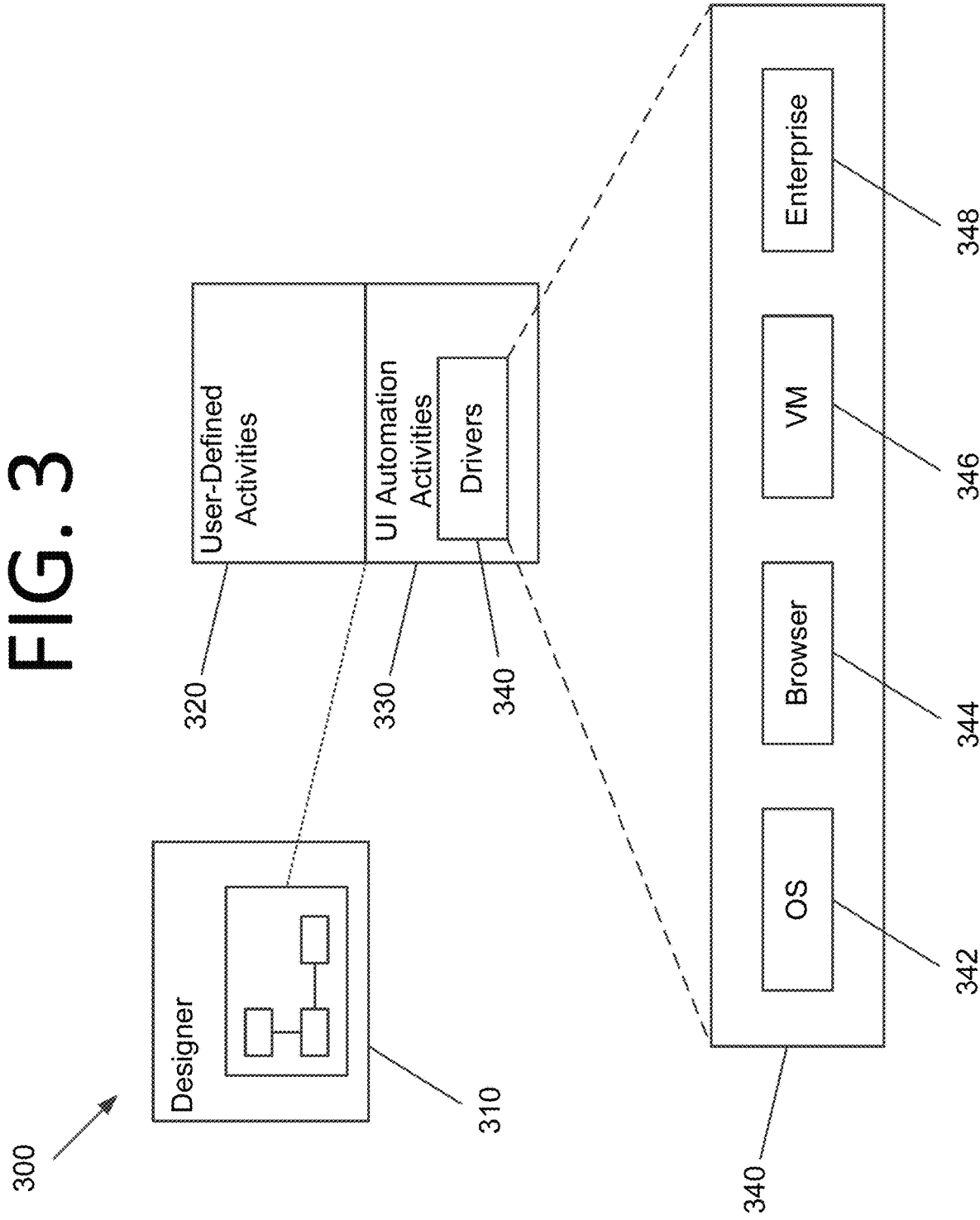
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some CV activities may include, but are not limited to, click, type, get text, hover, element exists, refresh scope, highlight, etc. Click in some embodiments identifies an element using CV, OCR, fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
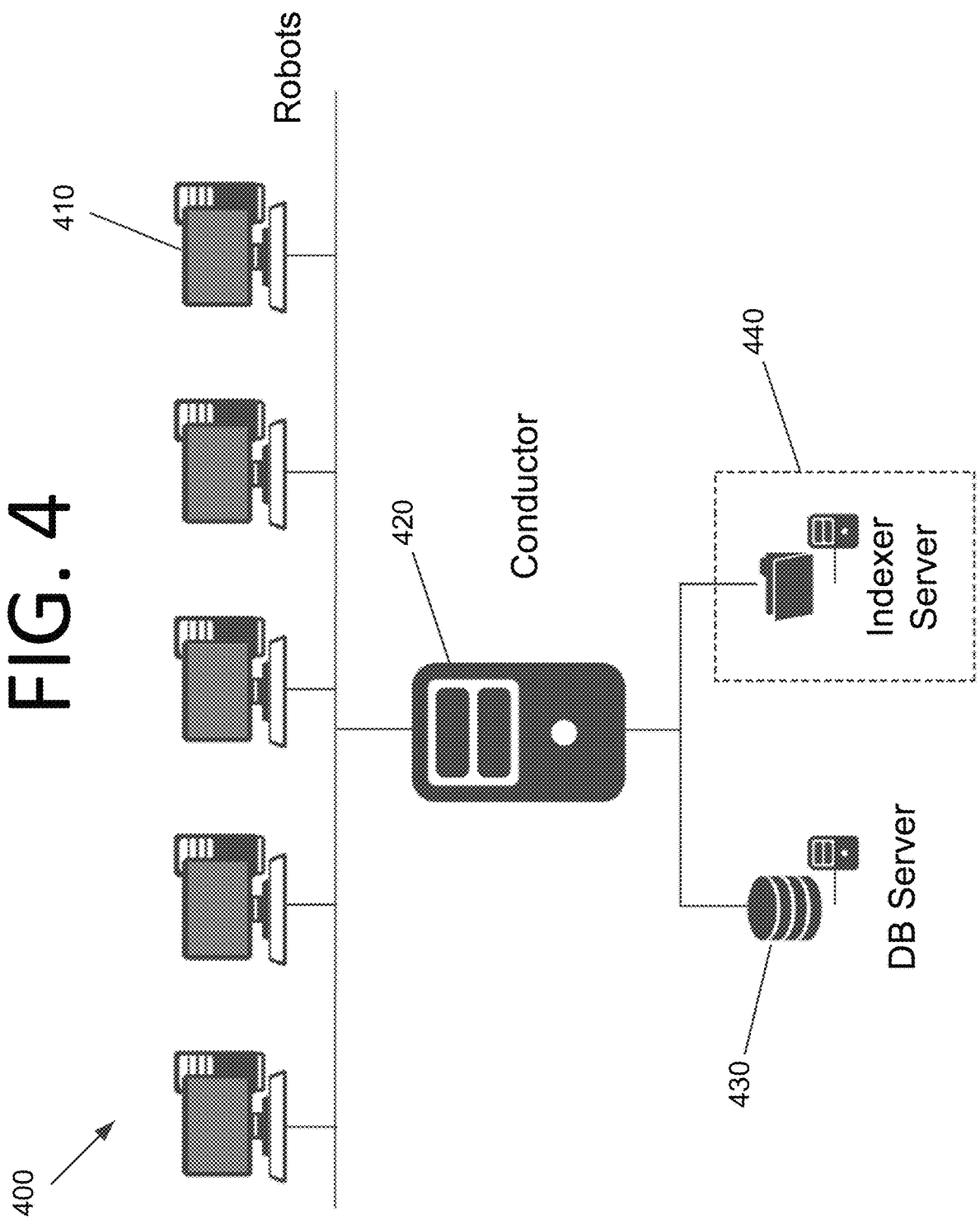
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 2 and 4, it should be noted that while a web application is used in these embodiments, any suitable client/server software may be used without deviating from the scope of the invention. For instance, the conductor may run a server-side application that communicates with non-web-based client software applications on the client computing systems.

Figure 5A:
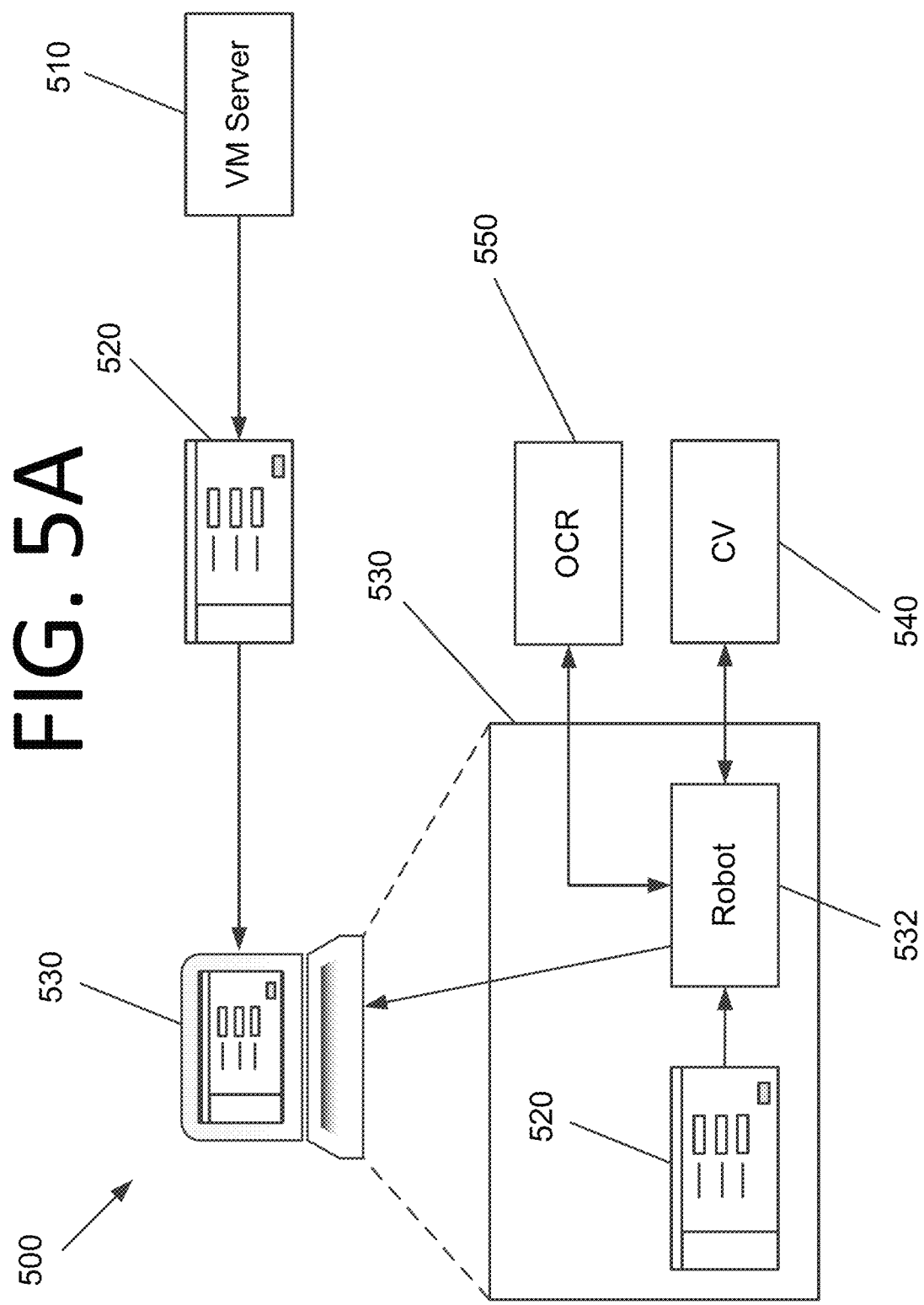
FIG. 5A illustrates an RPA implementation employing CV for a Virtual Machine (VM) system at runtime, according to an embodiment of the present invention.

FIG. 5A illustrates an RPA implementation 500 employing CV for a VM system at runtime, according to an embodiment of the present invention. A VM server 510 produces a series of images 520 that are sent to a client computing system 530. Images 520 may be displayed by an application running on computing system 530. Alternatively, images 520 may be displayed as the screen of computing system 530 itself.

Images 520 from VM server 510 are sent to a robot 532, which receives identifications of graphical components from a CV model executed on CV server 540, as well as OCR data from an OCR server 550 (e.g., that provided by Google®, Microsoft®, Abbyy®, etc.). In some embodiments, the CV model and OCR may be executed on the same server. In certain embodiments one or both of the CV model and OCR may be executed on computing system 530. In some embodiments, robot 532 may reside on a different computing system, so long as it has access to image 520 and data from CV server 540 and OCR server 550. Robot 532 processes the information received from the CV model and OCR, and uses this information to recognize graphical components in the image. The robot then performs the desired activities (e.g., filling in information, clicking buttons, interfacing with third party software, etc.).

FIG. 5B illustrates RPA implementation 500 where a graphical component was misidentified or not identified at design time, according to an embodiment of the present invention. Rather than running a robot 532, computing system 530 is running a designer 534 in this embodiment. It should also be noted that while computing system 530 is shown in FIG. 5B as being the same computing system. In this case, the user has drawn a bounding shape 522 encompassing a section of image 520 where the graphical component was misidentified or not identified.

Designer 534 receives the representative data of bounding shape 522 and sends this information, along with image 520, to an image database 560. Image database 560, in turn, provides the representative data and image to a reviewer's computing system 570. The human reviewer using reviewer computing system 570 may be a software engineer or some other individual who has the ability to determine whether the graphical component was actually not identified or misidentified. The human reviewer then runs the image through the CV model via CV server 540 and checks the result. If the image and representative data submitted by designer 534 are indeed indicative of such an error, the reviewer, via reviewer computing system 570, labels the misidentified or unidentified graphical component correctly and sends image 520 to an ML system 580 (e.g., one or more servers, distributed or cloud computing systems, supercomputers, quantum computing systems, etc.) with the appropriate label for retraining. ML system 580 then starts the deep learning retraining process for the CV model. Per the above, in some embodiments, this retraining may be done in a batch after other errors are received due to the relatively long time that DLNN systems may take to retrain the CV model.

During normal operation of CV in some embodiments, the following three types of information are stored in image database 540 and may be used for retraining: (1) design time images; (2) reported issues; and (3) image matching areas. Design time images in some embodiments are screenshots that are captured when the user indicates to the application that he or she would like to automate. Such screenshots may be the full UI with no additional data in some embodiments. This may be so that a reviewer may look at the screenshot and its detection results and check whether everything was detected properly. If so, the screenshot may be discarded. However, if any error(s) are noticed, the reviewer may label the error(s) accordingly and send the error(s) to ML system 580 (e.g., an ML training server).

With respect to reported issues, in some embodiments, when an element is not detected or misidentified, the user may click the "report issue" button, make a selection (e.g., via drawing a box) to indicate the area where the error exists, and click a submit button, for example. This screenshot image and the highlighted area are then sent to a reviewer. The reviewer checks whether there was indeed an error, labels the element(s) with the proper label(s), and sends the image and correct label(s) to ML system 580 for retraining.

Image matching areas may follow the same general flow as reported issues in some embodiments. The full UI and the coordinates of the image matching area may be sent to image database 540. A reviewer then checks everything, and if there are error(s), sends the data to ML system 560 for retraining.

Once the CV model has been retrained, ML system 580 sends the retrained CV model to CV server 540. The retrained CV model is then used to perform CV analysis on future versions of image 520.

Per the above, some embodiments are capable of performing CV and OCR on SAP, Flash, Silverlight, PDFs, images of various formats (e.g., JPG, PNG, BMP, etc.), and the like. In the case of SAP, an SAP server may take the place of VM server 510. In some embodiments, multiple server types (e.g., VM servers, SAP servers, etc.) may communicate with client computing system 530 simultaneously. In certain embodiments, in addition to or in lieu of the remote server(s) discussed above, local instances of Flash, Silverlight, PDFs, images, etc. may be displayed on client computing system 530, and robot 532 may process their images as discussed above.

Figure 6A:
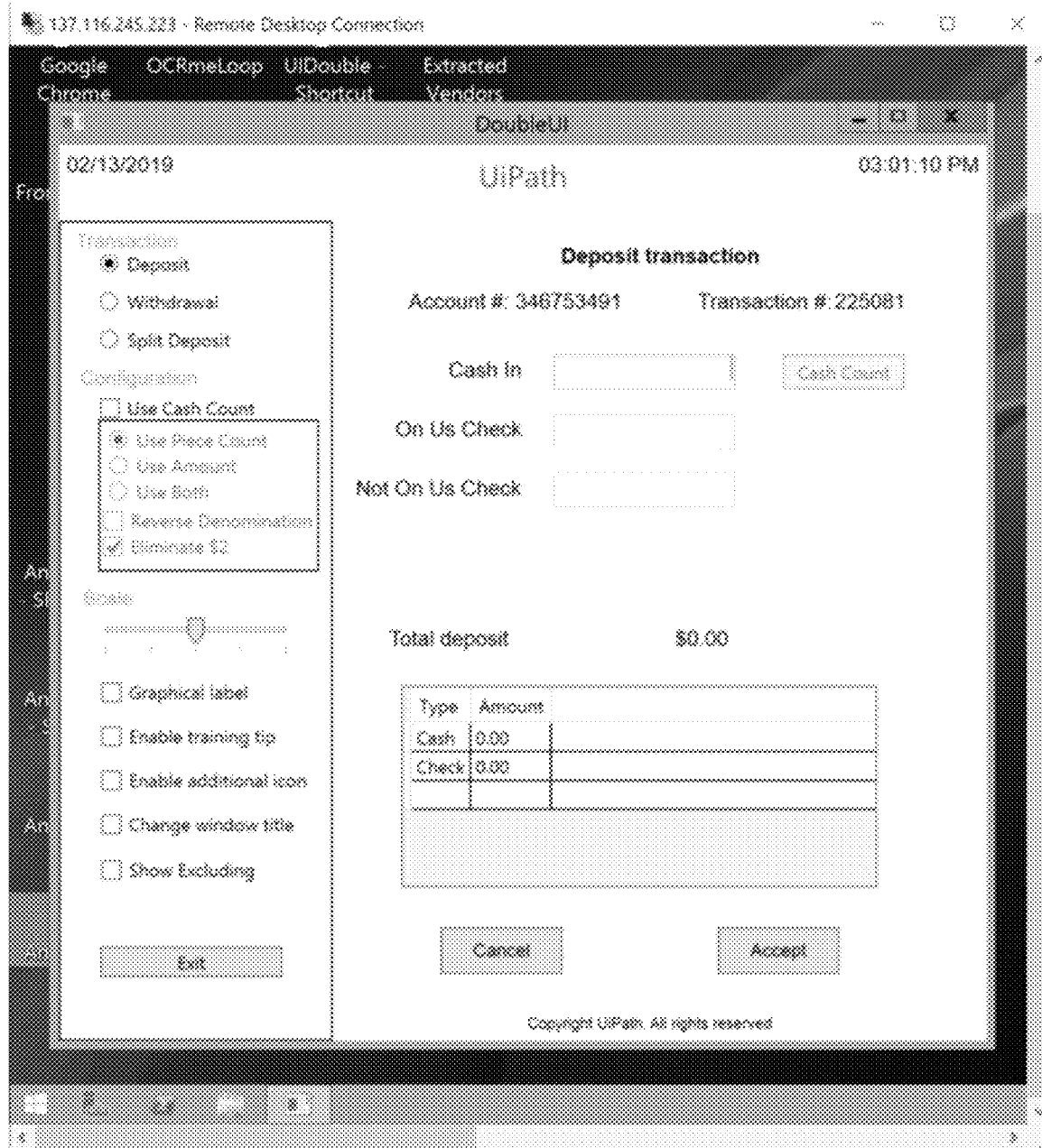
FIG. 6A is a screenshot illustrating a remote desktop connection window for a VM before a user has attempted to select a graphical component on the screen.
Figure 6B:
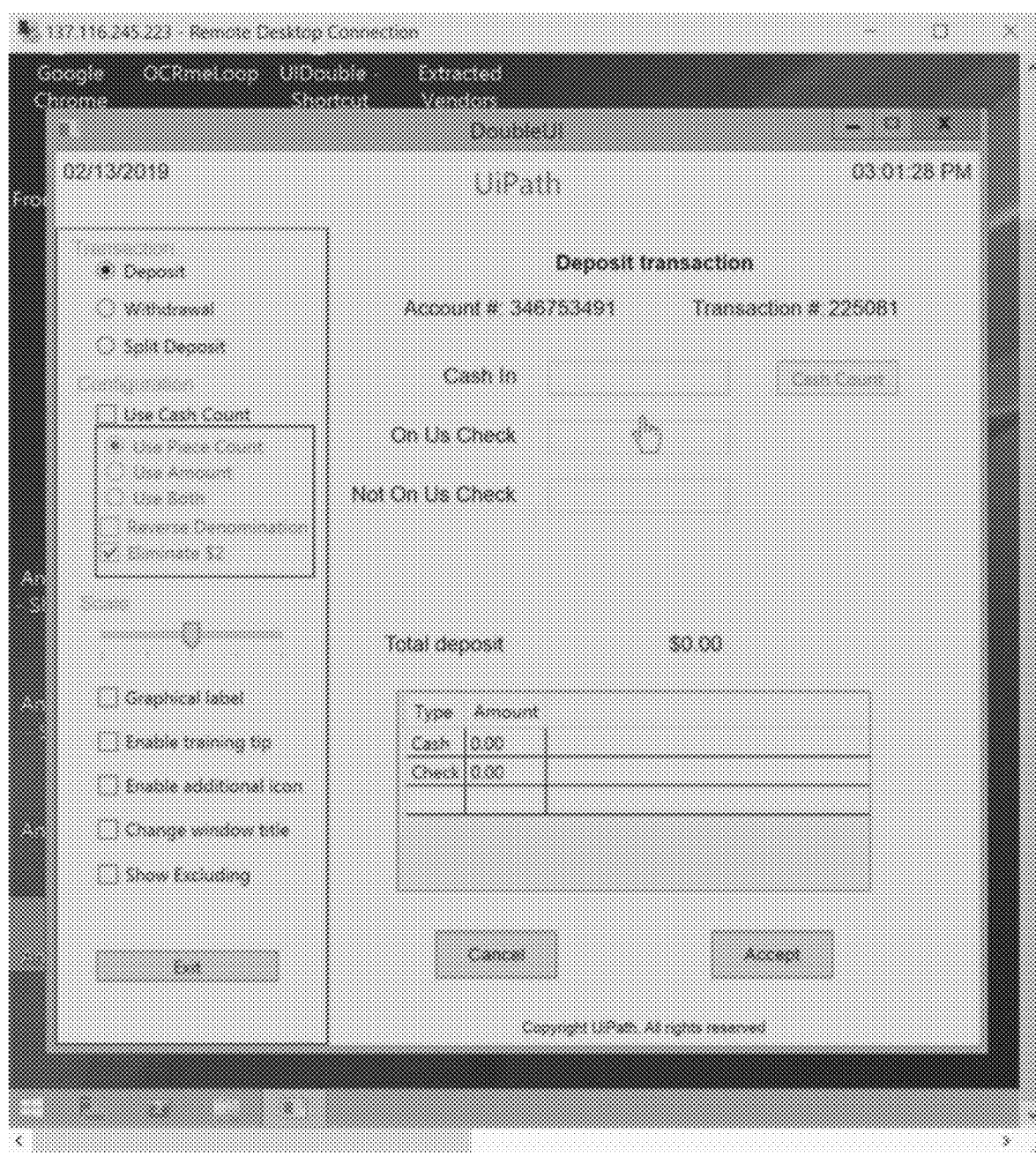
FIG. 6B is a screenshot illustrating the remote desktop connection window for the VM after the user has attempted to select the graphical component on the screen.

FIGS. 6A and 6B illustrate a remote desktop connection window 600 for a VM before (FIG. 6A) and after (FIG. 6B) a user has attempted to select a graphical component on the screen. As can be seen, when the user seeks to select the field next to "On Us Check", the entire window is highlighted. This is because remote desktop connection window 600 is merely an image.

Figure 7A:
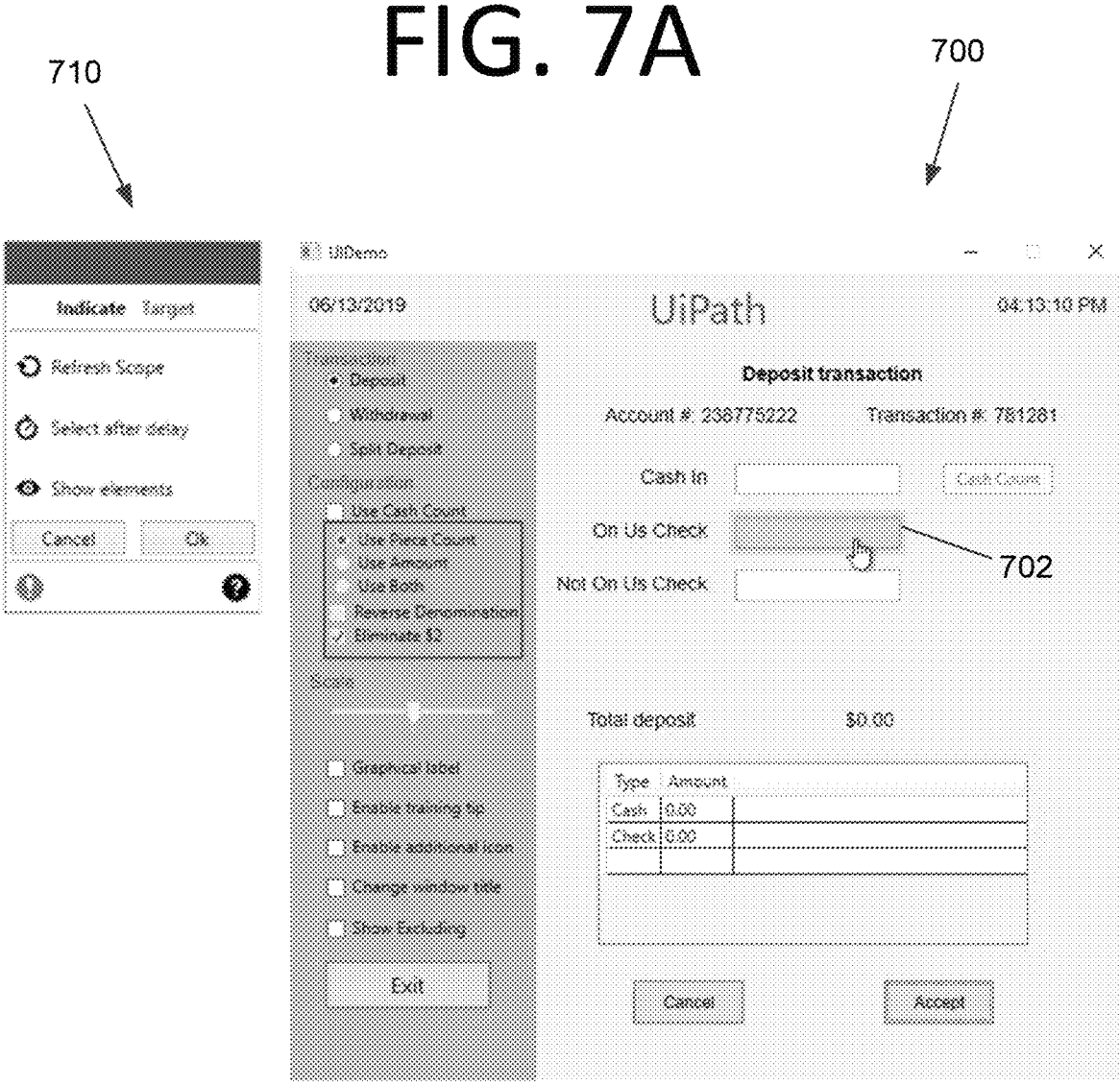
FIG. 7A is a screenshot illustrating a selector tool window and a remote desktop connection window after CV/OCR have been run and the results have been displayed to the user via the designer, according to an embodiment of the present invention.
Figure 7B:
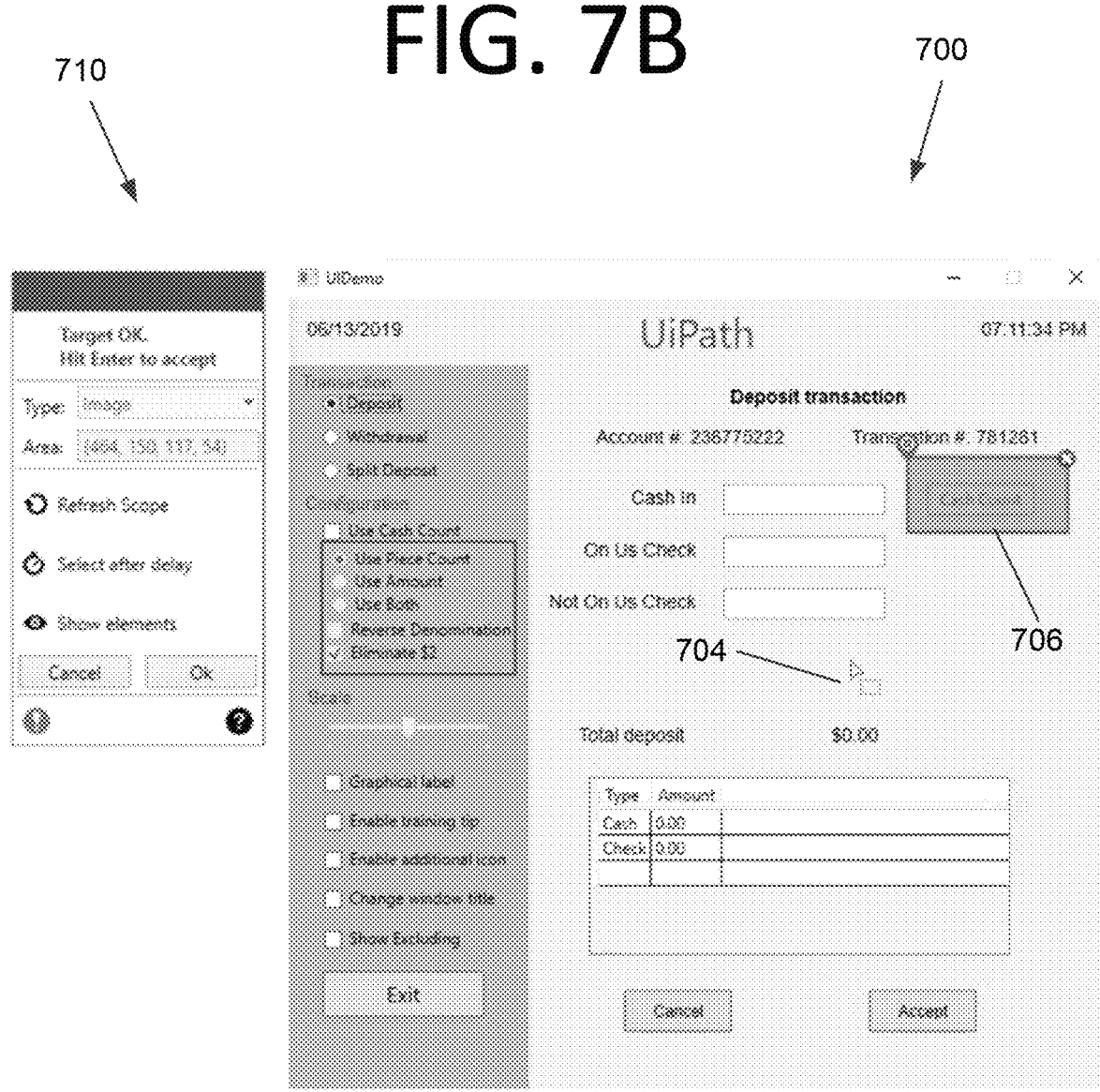
FIG. 7B is a screenshot illustrating the selector tool window and the remote desktop connection window after the user has selected a graphical component as not being correctly identified or being misidentified, according to an embodiment of the present invention.

FIG. 7A is a screenshot illustrating a selector tool window 710 and a remote desktop connection window 700 after CV/OCR have been run and the results have been displayed to the user via the designer, according to an embodiment of the present invention. As can be seen, text field 702 is now identified and selectable, which was not the case with window 600. However, the CV model may not always identify all of the graphical components correctly and/or may miss one or more graphical components. For instance, assume that the "Cash Count" button was not identified by the CV model, for example. In such a case, the user may use selector tool window 700 that allows the user to make a selection 704. See FIG. 7B. In this embodiment, results pertinent to the selection are shown in selector window 710. The user may then select the area on the screen where the misidentification or non-identification occurred, creating a selected area 706. It should be noted that per the above, any suitable shape may be defined and/or used without deviating from the scope of the invention.

In some embodiments, the image and representative data are stored in an automation file (workflow) and will be used at runtime in order to locate that specific screen element and operate it (clicking it, for example) when a robot executes the workflow logic autonomously. In certain embodiments, behind the scenes, the image and representative data pertaining to the selection indicated by the user are sent to an image database to be reviewed by a reviewer, and possibly used for retraining. Per the above, this may occur without the user's knowledge.

Figure 7C:
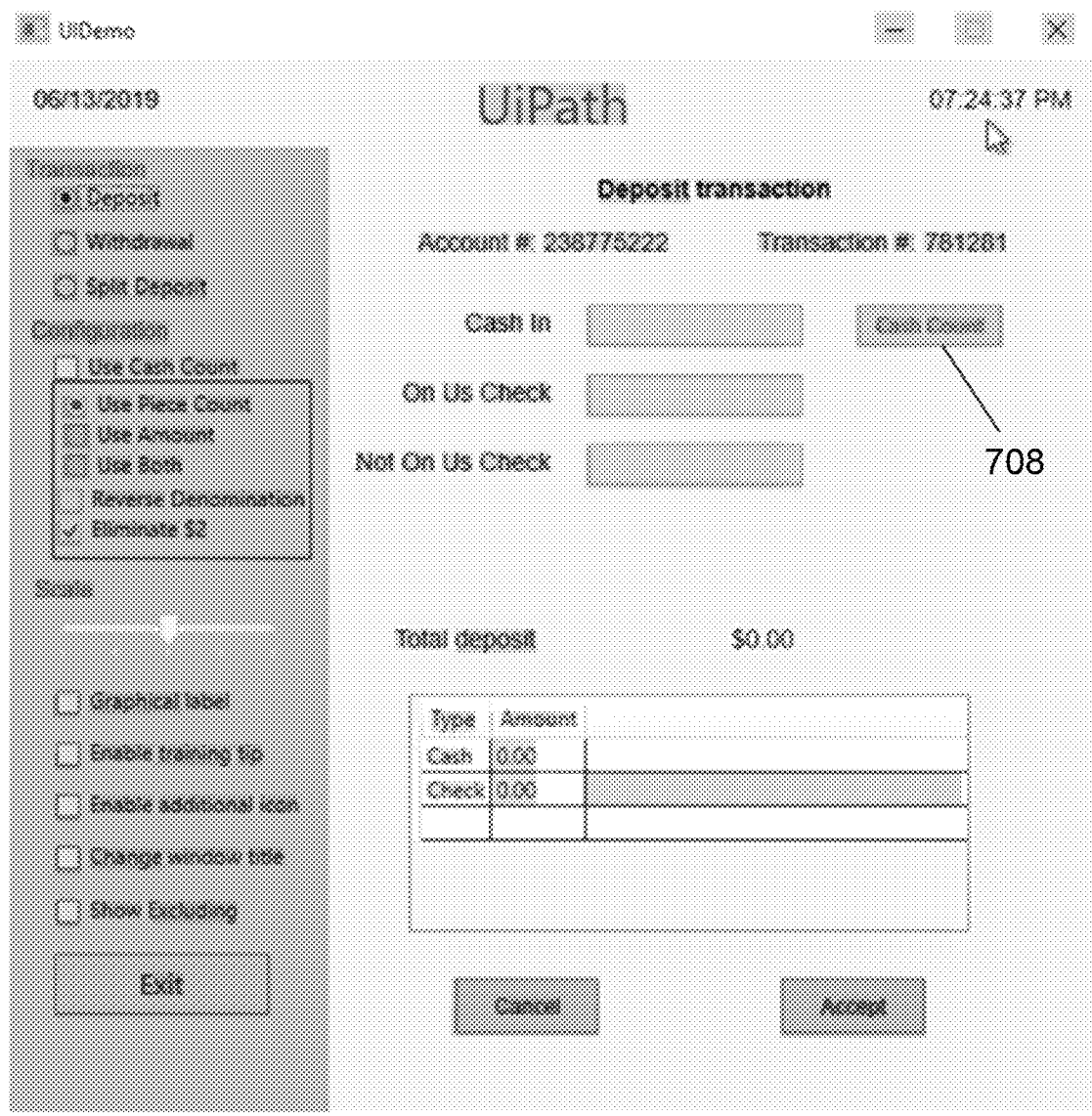
FIG. 7C is a screenshot illustrating the remote desktop connection window after retraining the CV model, according to an embodiment of the present invention.

After retraining of the CV model occurs, the CV model may be run again and used by the designer to show the user the graphical components identified therein. Now, all of the graphical components in window 700 should be correctly identified, as indicated by the shading in FIG. 7C. Cash count button 708 is now recognized. Once the user is confident that the workflow is operating correctly and all graphical components are properly identified, the workflow can be autonomously executed by a robot.

Figure 8:
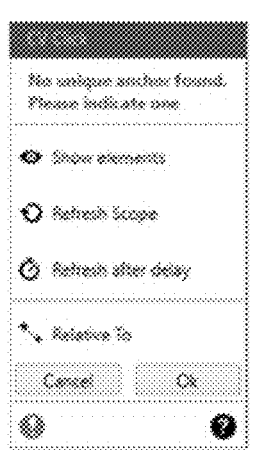
FIG. 8 is a screenshot illustrating an anchor designation window and a remote desktop connection window after CV/OCR have been run and the results have been displayed to the user via the designer, according to an embodiment of the present invention.
Figure 8:
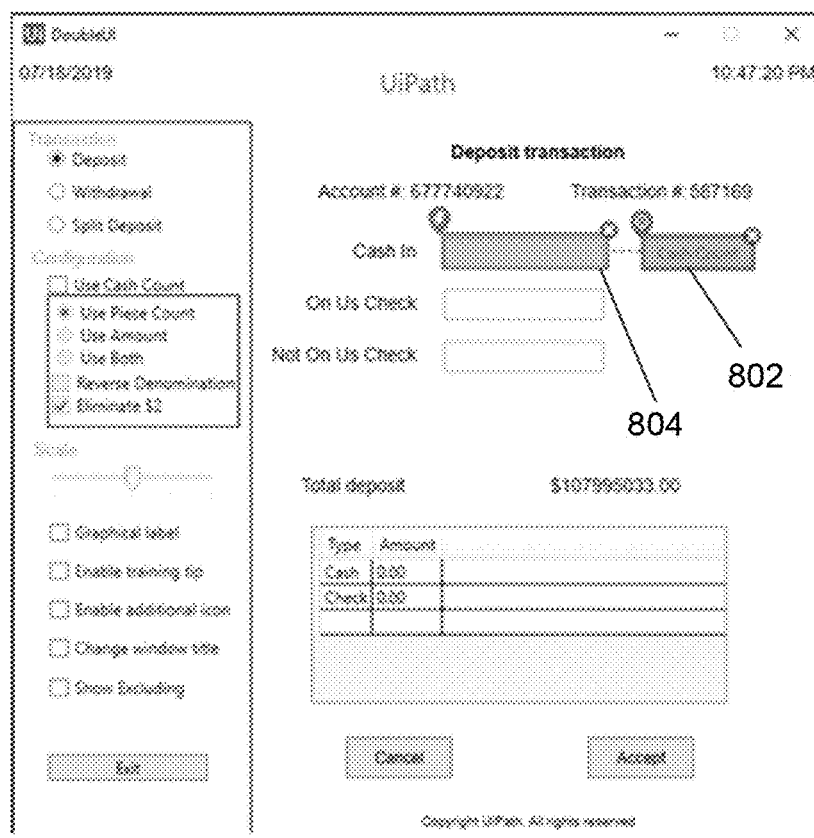

In some embodiments, a multi-anchor matching algorithm is employed for uniquely recognizing graphical components in an image. The CV model may identify specific graphical components on the screen. FIG. 8 is a screenshot illustrating an anchor designation window 810 and a remote desktop connection window 800 after CV/OCR have been run and the results have been displayed to the user via the designer, according to an embodiment of the present invention. Here, the user identifies Cash Count button 802 as a target. The user then identifies a text field 804 to its left as an anchor. In this case, the presence of text field 804 to the left of Cash Count button 802 is sufficient to uniquely identify it.

However, this may not be sufficient to uniquely identify the graphical component in all cases (e.g., there are two text labels "Name" to the left of two different text fields). In such a case, the user may be asked to add one or more unique discriminator anchors to uniquely identify the graphical component. Positional information, size information, orientation information, etc. pertaining to the anchors and target may be used to define characteristics of a geometric shape or a graphical structure (e.g., a graphical "star" such as an out-star, but without directions (vectors), multiple line segments connected in various ways, etc.). This shape or structure may then be used to uniquely determine the target graphical component.

By way of nonlimiting example, consider the case mentioned above, where a certain text label is found to the left of a name text field (e.g., "Name"). However, assume that the image also includes a second name text field with the same label text to its left. The presence of this label alone does not distinguish between the two text fields in and of itself.

However, it may be the case that the positional relationship of another graphical element allows the unique identification of one text field versus the other. For instance, a button may be located in a certain place on the screen. By analyzing characteristics (e.g., vertex coordinates) of a triangle between one text field, the label to its left, and the button versus the characteristics of a triangle between the other text field, the label to its left, and the button, it is possible to uniquely distinguish between the two. This unique identification allows a robot executing the workflow to subsequently correctly identify both text fields and populate them with the appropriate respective information.

Figure 9A:
FIGS. 9A-C illustrate an example of a multi-anchor matching algorithm, according to an embodiment of the present invention.
Figure 9B:
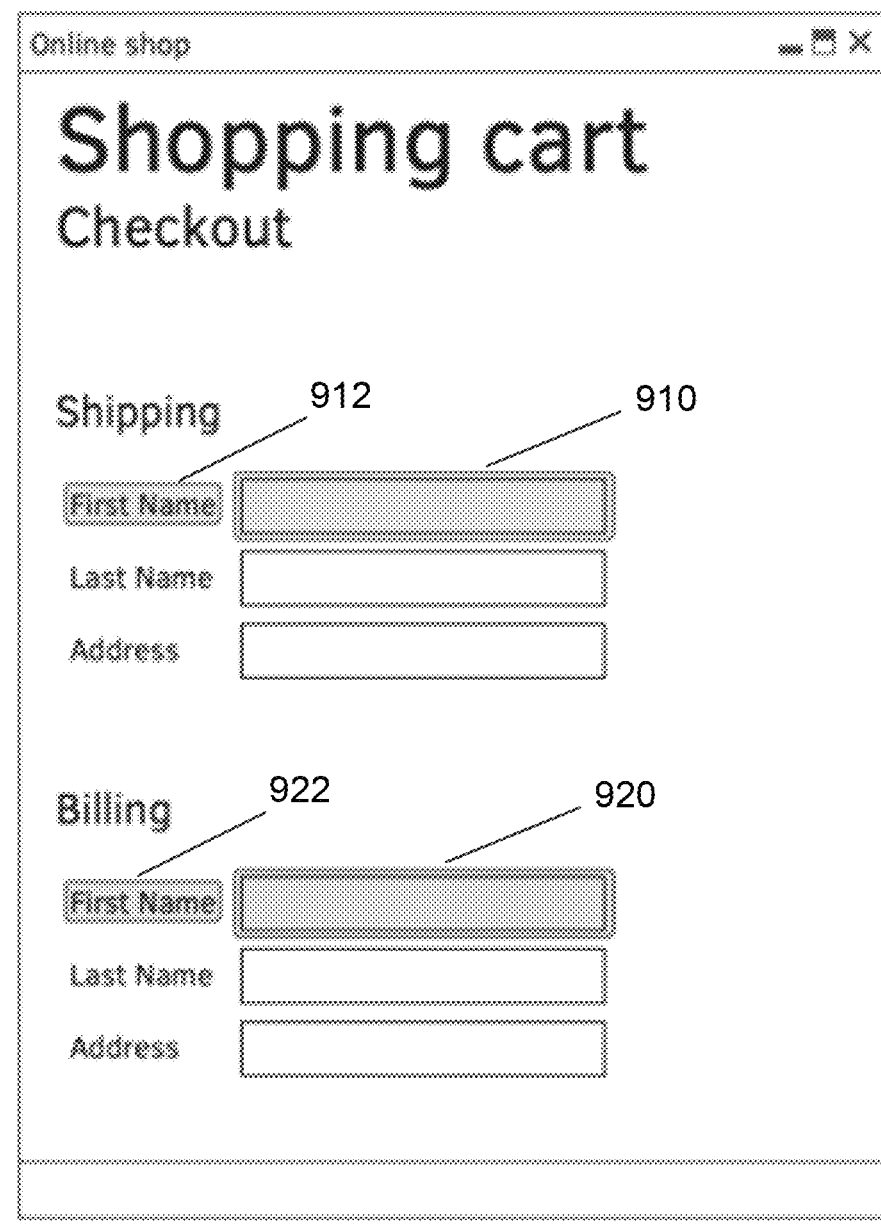
Figure 9C:
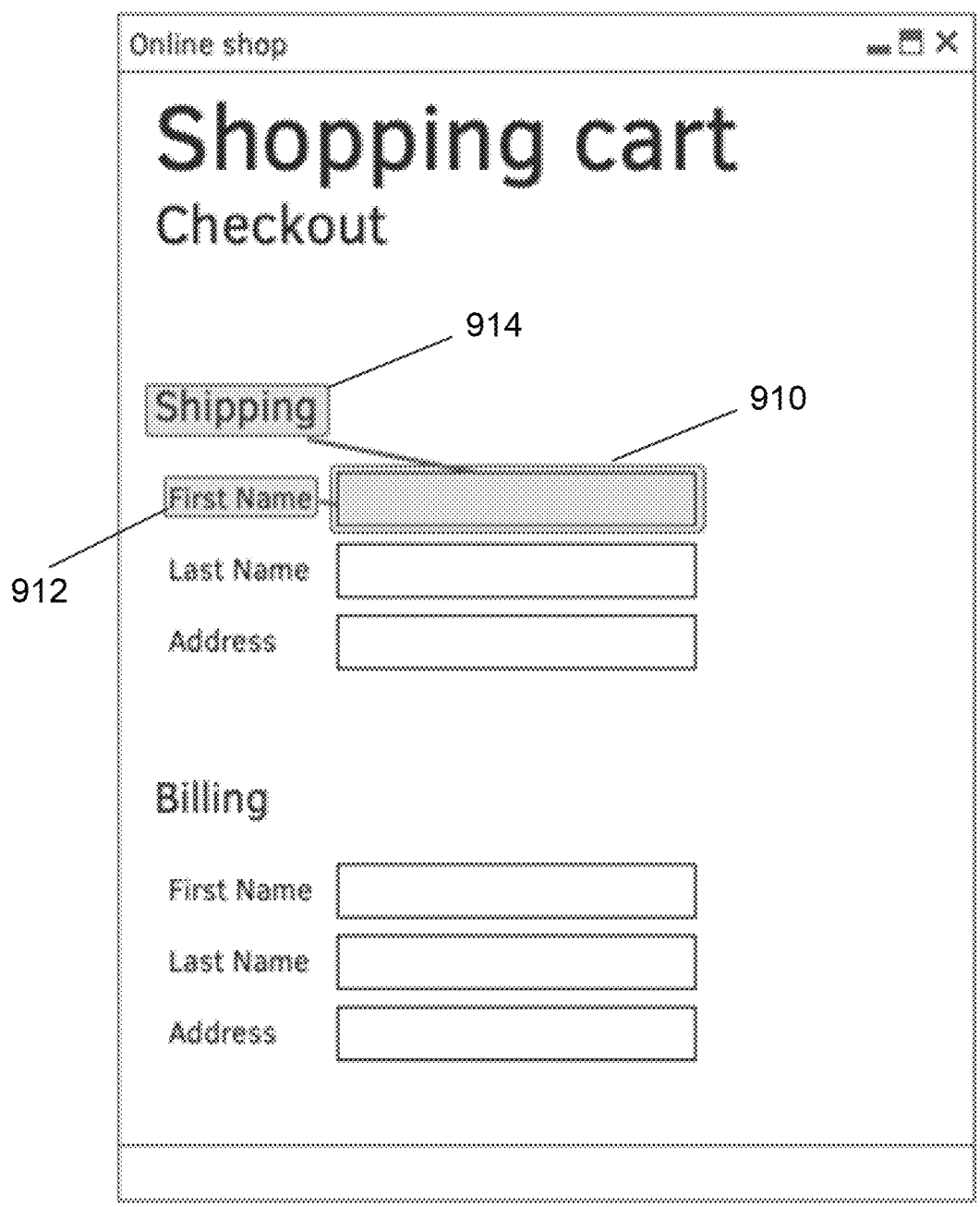

FIGS. 9A-C illustrate such an example. A window 900 includes a form with duplicate labels and text fields. Labels may be recognized using OCR and text fields may be recognized using a CV model. In this case, window 900 includes first name text fields 910, 920 and first name labels 912, 922.

As seen in FIG. 9B, for example, a "First Name" label to the left of a text field is not enough to uniquely distinguish between first name text field 910 and first name text field 920. For instance, when the user selects first name label 912 as an anchor to identify first name text field 910 as a target, the system recognizes that this would also identify first name text field 920. The system thus shades first name text field 920 and first name label 922 to let the user know that first name label 912 alone as an anchor will not work. Recognizing that at another anchor is thus required, the user selects shipping label 914 as a second anchor. The system recognizes that this allows the unique identification of first name text field 910 in this form.

It should also be kept in mind that the relative positions of each graphical component may change somewhat from one image to another (consider the case of a scanned receipt, for example). However, by defining respective shape relationships (in this case, coordinates in window 900 for target 910 and each anchor 912, 914, as well as line segments between their edges, although any desired location may be used without deviating from the scope of the invention) and looking at the segment lengths and angles, it can be determined which text field is which. While line segments from target 910 to each anchor 912, 914 are used here, any desired number of anchors and any desired shape(s) may be used without deviating from the scope of the invention. Indeed, any geometric (e.g., triangle, rectangle, etc.) or non-geometric shapes (e.g., non-closed line segment-based structures such as that shown) may be used without deviating from the scope of the invention.

In some embodiments, the angles and segment lengths of the shapes defined by the multi-anchor matching algorithm may be elastic within a tolerance to accommodate changes in scale, DPI, color variance, fonts, video frame rates, shadowing, etc. in the UI. Elasticity may be particularly beneficial for a video stream or images from a VM in some embodiments. In certain embodiments, however, the algorithm may be relatively or fully inelastic, employing limited tolerances in the former case and no tolerance in the latter case. This may assist in finding close matches or exact matches, respectively.

Text fuzzy-matching logic may be used in some embodiments to compensate for inaccuracies or errors in OCR engines, such as Google® cloud OCR, Microsoft® OCR, Tesseract® OCR, etc. As an example, with text fuzzy matching, detecting "NAM" or "NME" may be logically associated or matched with "NAME".

In the examples given herein, geometric matching with thresholding, such as for relative distance associated with an anchor, may be utilized for RPA of a UI. As an example, each element in an image of a UI may be related with a confidence level. Possible matches of an element below the threshold may be discarded for matching. By way of non-limiting example, detected elements below a CI of 60% may be discarded.

In some embodiments, at least part of the geometric shapes defined by the multiple anchors and target may snap horizontally and/or vertically with a smaller tolerance for geometric thresholding. Thresholding may otherwise take place as described above, but with a tighter tolerance. This may be done in cases where the location of graphical components relative to one another is likely to be fixed.

Figure 10:
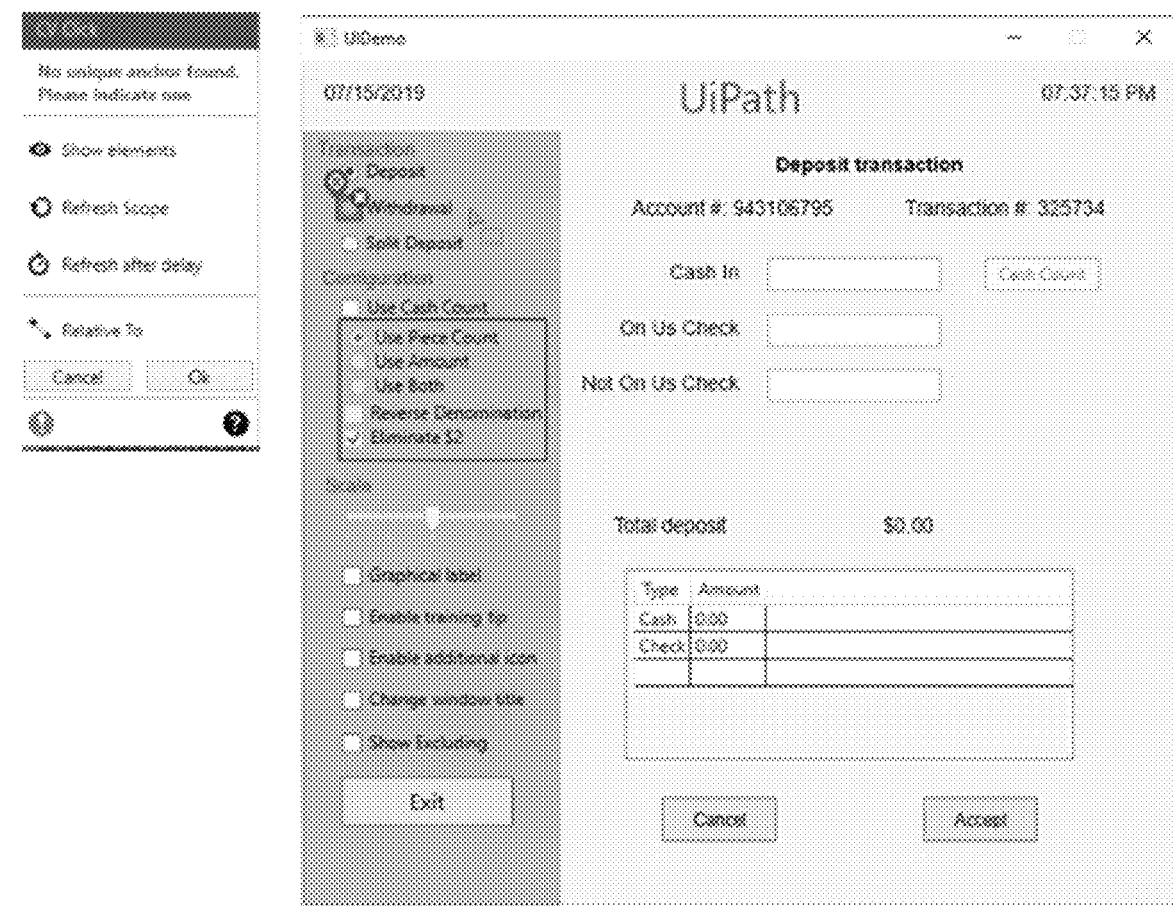
FIG. 10 is a screenshot illustrating an anchor designation window and a remote desktop connection window after CV/OCR have been run and the results have been displayed to the user via the designer, according to an embodiment of the present invention.

In certain embodiments, a list of probabilities may be returned from the CV model for each graphical element. When an element is misidentified, other elements may be used as anchors to make the determination. For instance, consider the case that a radio button was misidentified as a checkbox as the most probable match. See screenshot 1000 and selector window 1010 of FIG. 10, for example. It tends to be the case that the second or third most likely match is the actual match. The addition of another anchor, such as a nearby radio button, helps to identify which element a given component is from the list of probabilities.

Consider another example where a CV model identified an object in the middle of the road as most likely being a bicycle. However, the object is actually a drone, and bicycle is lower on the list of probabilities. Having the rider as an "anchor" could allow the CV model to correctly identify the object as a bicycle.

Figure 11:
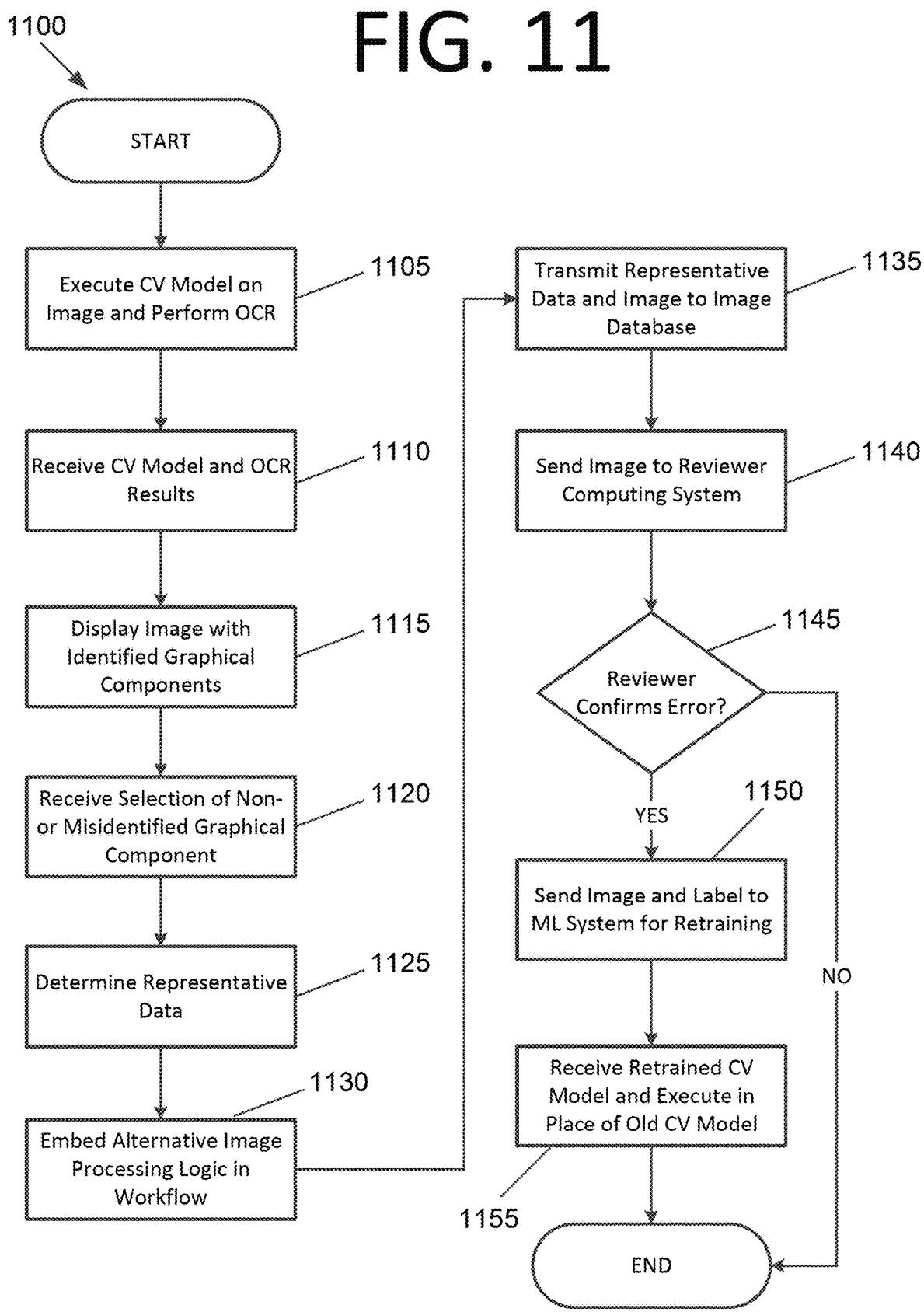
FIG. 11 is a flowchart illustrating a process for retraining a CV model, according to an embodiment of the present invention.

FIG. 11 is a flowchart illustrating a process 1100 for retraining a CV model, according to an embodiment of the present invention. Process 1100 begins with executing a CV model and OCR on an image that includes graphical components to identify the graphical components within the image at 1105. In some embodiments, the image is from a virtual machine (VM). A designer application then receives identifications of graphical components and text from executing the CV model and OCR at 1110. The designer displays the image at 1115 with the identified graphical components that were identified by the CV model on a visual display. The designer then receives a selection of a misidentified or non-identified graphical component in the image at 1120. Based on this selection, the robot determines representative data of an area of the image that includes the selection at 1125 and embeds the image to be used with alternative image processing logic (e.g., image-matching logic) in the workflow at 1130. The representative data and the image are then transmitted to an image database at 1135.

In some embodiments, the representative information comprises coordinates, line segments, or both, that define a shape having an area. In certain embodiments, a user of a computing system on which the designer is running manually makes the selection of the misidentified or non-identified graphical component, and the designer does not provide the user with an indication that the representative data and the image are being submitted for retraining of the CV model. In some embodiments, the CV model employs a multi-anchor matching algorithm that uses shape characteristics defined by a target graphical component and at least two anchor graphical components in the image to determine a type of the target graphical component. In certain embodiments, a set of coordinates for the target graphical component and each anchor graphical component are used as endpoints of the shape and to define line segments and angles in the geometric shape, and the angles and lengths of the line segments of the geometric shape are elastic within a tolerance to accommodate changes in scale, DPI, color variance, fonts, video frame rates, shadowing, or any combination thereof.

After receipt by the image database, the image is transmitted to a reviewer computing system at 1140. A reviewer operating the reviewer computing system (or the reviewer computing system itself automatically) executes the CV model on the image or causes the CV model to be executed. If the reviewer does not believe the error exists at 1145, the process ends, and the image may be deleted from the image database in some embodiments. If, however, the reviewer confirms the error at 1145, the image and a correct label for the misidentified or non-identified component are sent to an ML system for retraining at 1150. After the ML system retrains the CV model, the retrained CV model is received by a CV server or a user computing system, for example, and the retrained CV model is used in place of the old CV model.

Figure 12:
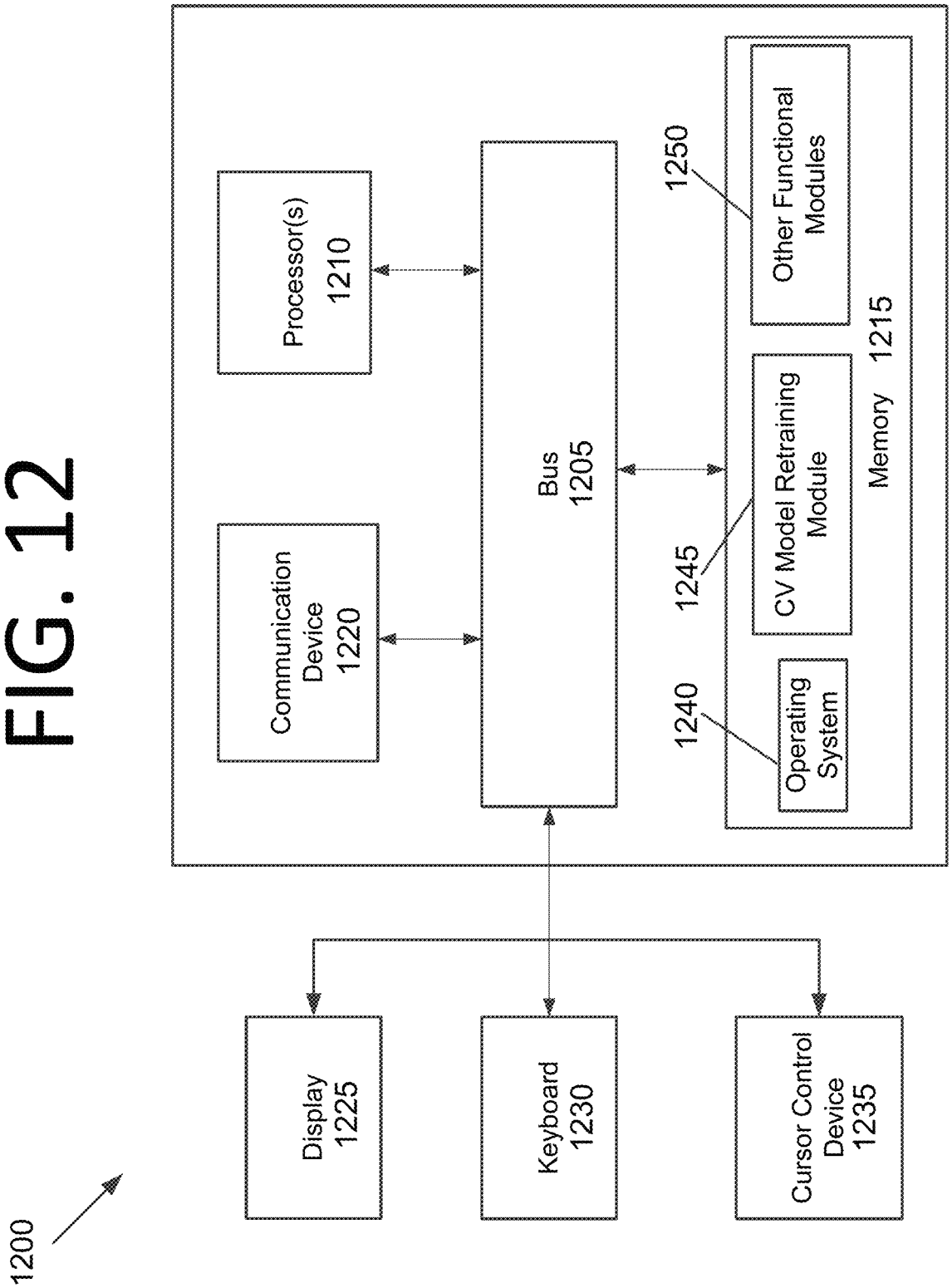
FIG. 12 is an architectural diagram illustrating a computing system configured to retrain a CV model, according to an embodiment of the present invention.

FIG. 12 is an architectural diagram illustrating a computing system 1200 configured to retrain a CV model, according to an embodiment of the present invention. In some embodiments, computing system 1200 may be one or more of the computing systems of FIGS. 1 to 5B. Computing system 1200 includes a bus 1205 or other communication mechanism for communicating information, and processor(s) 1210 coupled to bus 1205 for processing information. Processor(s) 1210 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1210 may also have multiple processing cores, and at least some of the cores may be configured to perform specific functions. Multi-parallel processing may be used in some embodiments. In certain embodiments, at least one of processor(s) 1210 may be a neuromorphic circuit that includes processing elements that mimic biological neurons. In some embodiments, neuromorphic circuits may not require the typical components of a Von Neumann computing architecture.

Computing system 1200 further includes a memory 1215 for storing information and instructions to be executed by processor(s) 1210. Memory 1215 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1210 and may include volatile media, non-volatile media, or both. The media may also be removable, non-removable, or both.

Additionally, computing system 1200 includes a communication device 1220, such as a transceiver, to provide access to a communications network via a wireless and/or wired connection. In some embodiments, communication device 1220 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 1220 may include one or more antennas that are singular, arrayed, phased, switched, beamforming, beam-steering, a combination thereof, and or any other antenna configuration without deviating from the scope of the invention.

Processor(s) 1210 are further coupled via bus 1205 to a display 1225, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 1225 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 1230 and a cursor control device 1235, such as a computer mouse, a touchpad, etc., are further coupled to bus 1205 to enable a user to interface with computing system. However, in certain embodiments, a physical keyboard and mouse may not be present, and the user may interact with the device solely through display 1225 and/or a touchpad (not shown). Any type and combination of input devices may be used as a matter of design choice. In certain embodiments, no physical input device and/or display is present. For instance, the user may interact with computing system 1200 remotely via another computing system in communication therewith, or computing system 1200 may operate autonomously.

Memory 1215 stores software modules that provide functionality when executed by processor(s) 1210. The modules include an operating system 1240 for computing system 1200. The modules further include a CV model retraining module 1245 that is configured to perform all or part of the processes described herein or derivatives thereof. For example, computing system 1200 may be a client computing system, a conductor server, a database server, an indexer server, a computing system that performs OCR and/or CV, a reviewer computing system, a computing system that performs all or part of an ML process, etc. However, it should be noted that in certain embodiments, such as where a GPU is used, the CV model retraining module code may be stored in local memory on that component. Computing system 1200 may include one or more additional functional modules 1250 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 11 may be performed by a computer program, encoding instructions for the processor(s) to perform at least part of the process described in FIG. 11, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) 1200 to implement all or part of the process steps described in FIG. 11, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A non-transitory computer-readable medium storing a computer program, the computer program configured to cause at least one processor to:
receive an image comprising a graphical element and receive representative data for the graphical element, the image and the representative data captured by a robotic process automation (RPA) designer application;
run the image through a computer vision (CV) model that identifies graphical elements in the image; and
provide a labeled image and the representative data for subsequent retraining of the CV model for a confirmed non-identified or misidentified graphical element to a machine learning system or a database accessible by the machine learning system, the machine learning system configured to retrain the CV model using the labeled image and the representative data.

2. The non-transitory computer-readable medium of claim 1, wherein the computer program is further configured to cause the at least one processor to:
label the misidentified or unidentified graphical component.

3. The non-transitory computer-readable medium of claim 1, wherein the image and the representative data are received from a database that stores images and representative data from RPA designer applications that are indicated to have non-identified or misidentified graphical elements.

4. The non-transitory computer-readable medium of claim 3, wherein
the images are design time screenshots, the representative data comprises image matching area selections, and
the database stores reported issues associated with the non-identified or misidentified graphical elements.

5. The non-transitory computer-readable medium of claim 1, wherein the image is from a virtual machine (VM).

6. The non-transitory computer-readable medium of claim 1, wherein the representative data comprises coordinates, line segments, or both, that define a shape having an area.

7. The non-transitory computer-readable medium of claim 1, wherein the computer program is further configured to cause the at least one processor to:
cause images and respective representative data to be discarded when no error is present.

8. The non-transitory computer-readable medium of claim 1, wherein the computer program is further configured to cause the at least one processor to:
highlight the graphical element in the image based on the representative data.

9. The non-transitory computer-readable medium of claim 1, wherein the CV model employs a multi-anchor matching algorithm that uses shape characteristics defined by a target graphical element and at least two anchor graphical elements in the image to determine a type of the target graphical element.

10. The non-transitory computer-readable medium of claim 9, wherein
a set of coordinates for the target graphical element and each of the at least two anchor graphical elements are used as endpoints of a geometric shape and to define line segments and angles in the geometric shape, and
angles and lengths of the line segments of the geometric shape are elastic within a tolerance to accommodate changes in scale, dots per inch (DPI), color variance, fonts, video frame rates, shadowing, or any combination thereof.

11. A computer-implemented method, comprising:
receiving an image comprising a graphical element and receiving representative data for the graphical element, by a computing system, the image and the representative data captured by a robotic process automation (RPA) designer application;

running the image through a computer vision (CV) model that identifies graphical elements in the image, by the computing system; and providing a labeled image and the representative data for subsequent retraining of the CV model for a confirmed non-identified or misidentified graphical element to a machine learning system or a database accessible by the machine learning system, by the computing system, the machine learning system configured to retrain the CV model using the labeled image and the representative data.

12. The computer-implemented method of claim 11, wherein
the image and the representative data are received from the database, and
the database stores images and representative data from RPA designer applications that are indicated to have non-identified or misidentified graphical elements.

13. The computer-implemented method of claim 12, wherein
the images are design time screenshots,
the representative data comprises image matching area selections, and
the database stores reported issues associated with the non-identified or misidentified graphical elements.

14. The computer-implemented method of claim 11, wherein the representative data comprises coordinates, line segments, or both, that define a shape having an area.

15. The computer-implemented method of claim 11, further comprising:
causing images and respective representative data to be discarded when no error is present, by the computing system.

16. The computer-implemented method of claim 11, wherein
the CV model employs a multi-anchor matching algorithm that uses shape characteristics defined by a target graphical element and at least two anchor graphical elements in the image to determine a type of the target graphical element,
a set of coordinates for the target graphical element and each of the at least two anchor graphical elements are used as endpoints of a geometric shape and to define line segments and angles in the geometric shape, and
angles and lengths of the line segments of the geometric shape are elastic within a tolerance to accommodate changes in scale, dots per inch (DPI), color variance, fonts, video frame rates, shadowing, or any combination thereof.

17. The computer-implemented method of claim 11, further comprising:
training the CV model, by a machine learning system, to recognize the non-identified or misidentified graphical element using the labeled image and the representative data; and
deploying the retrained CV model, wherein
the retrained CV model is used by the RPA designer application in place of the CV model.

18. A computing system, comprising:
memory storing computer program instructions; and
at least one processor configured to execute the computer program instructions, wherein the computer program instructions are configured to cause the at least one processor to:
receive an image comprising a graphical element and receive representative data for the graphical element, the image and the representative data captured by a robotic process automation (RPA) designer application;
run the image through a computer vision (CV) model that identifies graphical elements in the image; and
provide a labeled image and the representative data for subsequent retraining of the CV model for a confirmed non-identified or misidentified graphical element to a machine learning system or a database accessible by the machine learning system, the machine learning system configured to retrain the CV model using the labeled image and the representative data.

19. The computing system of claim 18, wherein
the image and the representative data are received from the database, and
the database stores images and representative data from RPA designer applications that are indicated to have non-identified or misidentified graphical elements.

20. The computing system of claim 18, wherein the representative data comprises coordinates, line segments, or both, that define a shape having an area.

21. The computing system of claim 18, wherein the computer program instructions are further configured to cause the at least one processor to:
cause images and respective representative data to be discarded when no error is present.

22. The computing system of claim 18, wherein
the CV model employs a multi-anchor matching algorithm that uses shape characteristics defined by a target graphical element and at least two anchor graphical elements in the image to determine a type of the target graphical element,
a set of coordinates for the target graphical element and each of the at least two anchor graphical elements are used as endpoints of a geometric shape and to define line segments and angles in the geometric shape, and
angles and lengths of the line segments of the geometric shape are elastic within a tolerance to accommodate changes in scale, dots per inch (DPI), color variance, fonts, video frame rates, shadowing, or any combination thereof.

* * * * *